Dec. 14, 1926.

P. McLAUGHLIN 1,610,564

COOKING APPARATUS

Filed March 30, 1926    3 Sheets-Sheet 1

Inventor
P. McLaughlin,
By Clarence A. O'Brien
Attorney

Dec. 14, 1926.

P. McLAUGHLIN 1,610,564

COOKING APPARATUS

Filed March 30, 1926    3 Sheets-Sheet 2

Inventor
P. McLaughlin,
By Clarence A. O'Brien
Attorney

Dec. 14, 1926.
P. McLAUGHLIN
1,610,564
COOKING APPARATUS
Filed March 30, 1926    3 Sheets-Sheet 3
Fig: 3
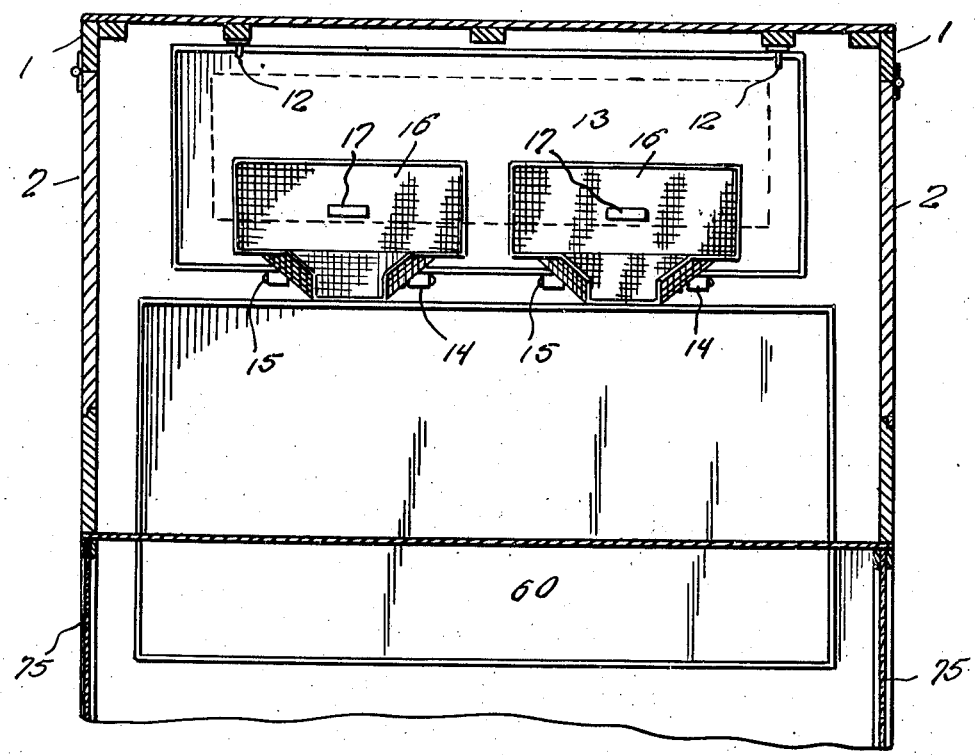
Fig: 5.
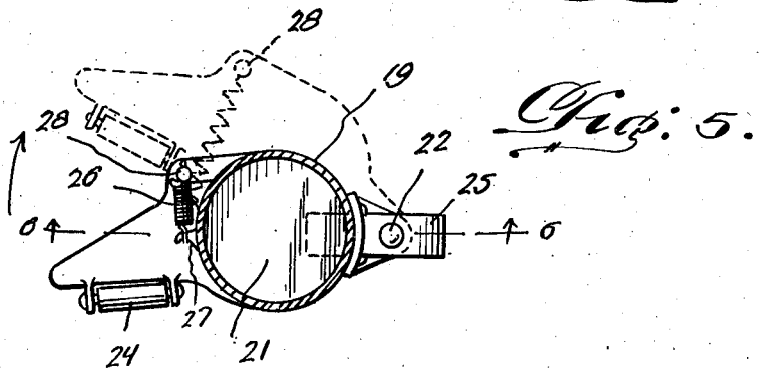
Inventor
P. McLaughlin,
By Clarence A. O'Brien
Attorney

Patented Dec. 14, 1926.

1,610,564

UNITED STATES PATENT OFFICE.

PATRICK McLAUGHLIN, OF DOVER, NEW HAMPSHIRE.

COOKING APPARATUS.

Application filed March 30, 1926. Serial No. 98,595.

My present invention has to do with the cooking of nuts or other food; and one of the objects of the invention is the provision of an apparatus of high efficiency so characterized that the cooking operation requires but little attention on the part of an operative or attendant.

Another object of the invention is the provision of an apparatus in which articles of food such as nuts may be cooked for a predetermined period of time without the care or attention of an attendant.

Another object of the invention is the provision of an apparatus having the capacity of function indicated and embodying a construction that is simple and inexpensive and is reliable in operation.

Other objects and practical advantages of the invention will be fully understood from the following description and claims when the same are read in connection with the drawings, accompanying and forming part of this specification, in which:—

Figure 3 is a horizontal section taken in the plane indicated by the line 3—3 of Figure 1, looking downwardly.

Figure 5 is an enlarged detail section illustrative of one of the cut-off mechanisms, said Figure 5 being taken in the plane indicated by the line 5—5 of Figure 1, looking downwardly.

Similar numerals of reference designate corresponding parts in all of the views of the drawings.

Figure 1:
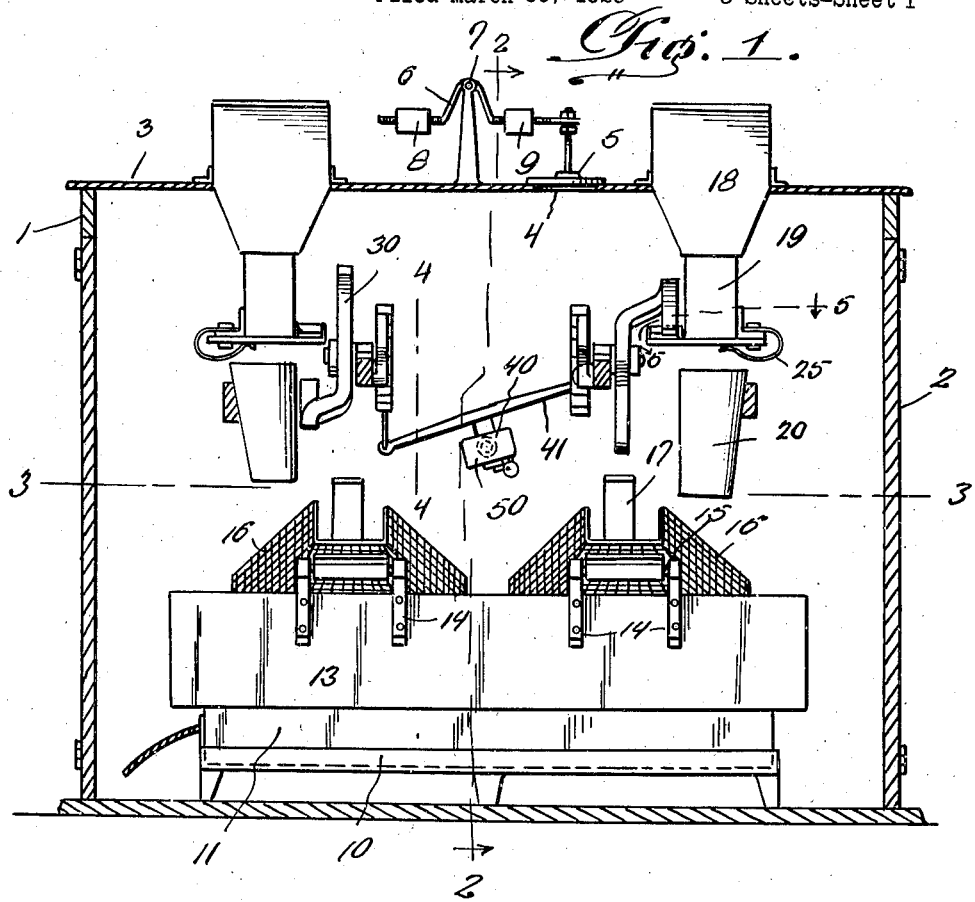
Figure 1 is a longitudinal vertical section showing the apparatus constituting the best practical embodiment of my invention of which I am cognizant.
Figure 6:
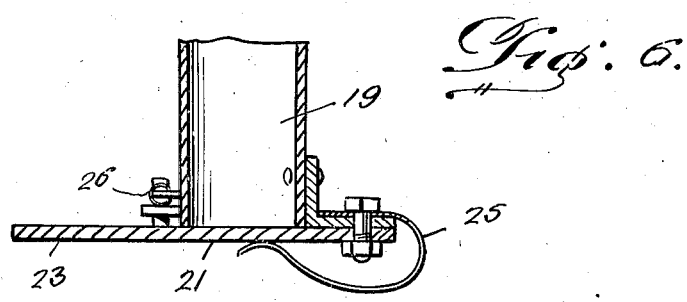
Figure 6 is a vertical section showing one of the cut off mechanisms and the tubular guide below the same.

Among other elements my apparatus comprises a casing 1 with appropriate doors 2 at its ends, Figures 1 and 3.

The casing 1 is substantially air tight and is provided in its top wall 3 with a vent opening 4, controlled by a valve 5 on one end of a lever 6 that is fulcrumed at 7 and is weighted at 8 and 9 and is adapted to normally maintain the valve 5 in closed position. When, however, the heat within the casing 1 reaches a predetermined degree, the pressure will force the valve 5 upwardly and allow the hot air to escape, and then following a lowering of the pressure in the casing 1, the valve 5 will gravitate to a closed position.

Arranged upon the bottom of the casing 1 is an appropriate stand 10, and carried by the said stand 10 is a heater 11 which is preferably, though not necessarily, an electric heater of conventional type or of any other construction compatible with the purpose of my invention. It is to be understood, however, that my invention does not reside in the heater 11 per se and therefore, any electric or other heater compactible with the purpose of my invention may be employed without affecting my invention.

Figure 2:
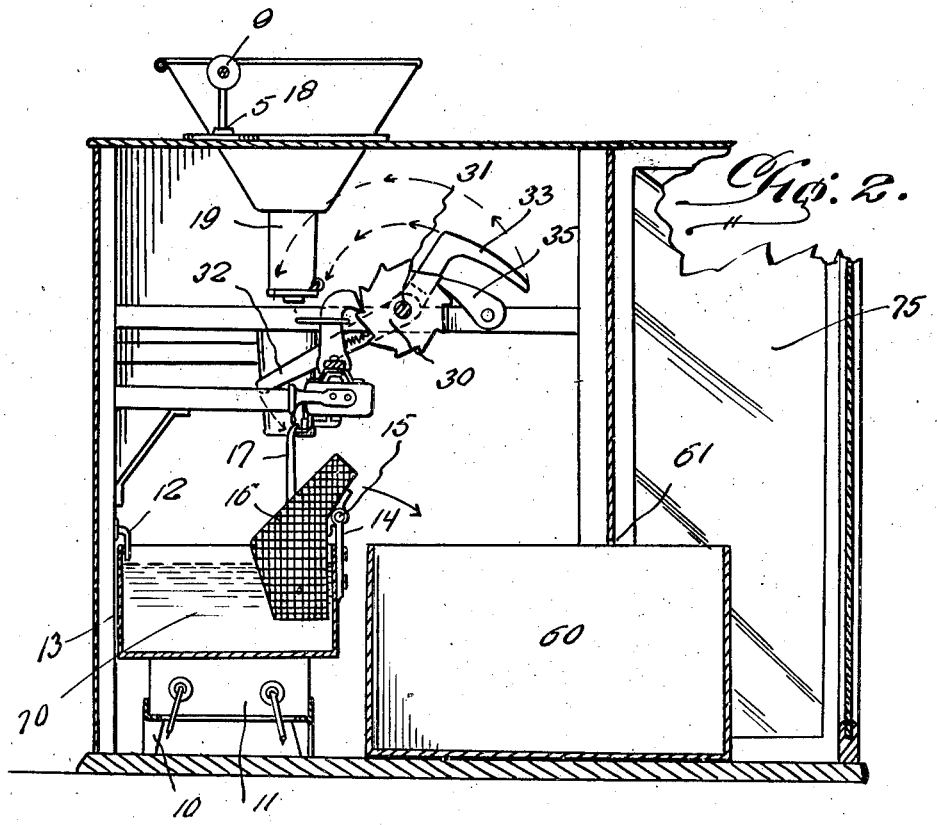
Figure 2 is a vertical section taken at right angles to Figure 1 and in the plane indicated by the line 2—2 of Figure 1.
Figure 4:
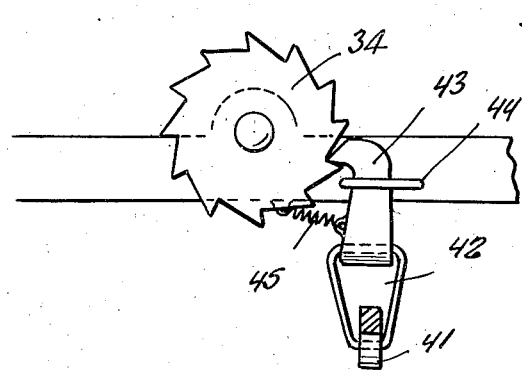
Figure 4 is a detail enlarged section taken in the plane indicated by the line 4—4 of Figure 1, looking toward the left.

Suitably retained in position in the casing 1, as designated by 12, and arranged above and preferably upon the heater 11 is a receptacle 13, designed to contain grease or oil and in which the cooking of nuts or other foods is effected. The said receptacle 13 is equipped with brackets 14, and pivoted at 15 to the said brackets are the swingable nut or food cages 16 of my improvement. The said cages 16 are preferably of reticulated material and are preferably shaped as shown in Figures 1, 2 and 3, and each cage 16 is provided with an arm 17 fixed thereto, and each cage 16 is designed to be swung from and back to the position shown in Figure 2.

Appropriately supported by and extending through the top wall 3 of the casing 1 are hoppers 18 with vertical spouts 19, and preferably arranged below and in spaced relation to the spouts 19 are tubular guides 20, appropriately supported in the casing 1 and designed to assure the gravitating nuts or other food dropping into the cages 16. I prefer to employ the tubular guides 20 for the reason indicated, but the said guides 20 are not of the essence of my invention and therefore may altogether be omitted when deemed expedient by the manufacturer, without affecting my invention.

As best shown in Figures 1 and 5, each of the spouts 19 is provided with a cut-off, the said cut-off comprising a horizontally swingable plate 21, pivoted at 22, and having an arm 23 and an anti-friction roller 24 thereon. A spring strip 25 presses against the plate 21 to prevent too free movement of said plate, and it will also be undestood that a retractile spring 26 is connected at 27 to the spout 19 and is also connected at 28 to the plate 21. Manifestly the said spring 26 will operate to yieldingly maintain the plate 21 in closed position so as to prevent the discharge of nuts or other articles from the spout 19. When, however, the plate 21 is swung from the full line position in Figure 5 to the dotted line position in said figure, and this against the action of the spring 26, nuts or other articles of food will be free to drop from the spout 19; and it will also be understood in this connection that when the plate 21 is released while in open position, the spring 26 will operate to promptly return the plate 21 to closed position.

For the swinging of the cages 16, I employ the before mentioned arms 17 on the cages 16 and I also employ tappet levers 30, two in number. The said tappet levers 30 are fulcrumed at 31 and have arms 32 to cooperate with the arms 17 and also have offset cam-like arms 33 for cooperation with the anti-friction rollers 24 of the cut-off plate 21 in the manner hereinafter described.

Fixed with respect to each tappet lever 30 is a ratchet disk 34, and associated with each ratchet disk 34 is a gravitational pawl 35 designed to prevent retrograde rotation of the disk. Fulcrumed in appropriate manner at 40, Figure 1, is a walking beam 41, and connected at 42 with the end portions of the said walking beam 41 are dogs 43, guided at 44 and retained in proper working position and subject to the action of retractile springs 45 so that the proper engagement of the said dogs with their respective ratchet disks 34 will at all times be assured. My invention contemplates the oscillation of the walking beam 41, and within the purview of my invention any appropriate means may be employed to establish and maintain the said oscillation during the operation of the apparatus. I prefer, however, to employ for the purpose a conventional oscillating electric motor 50 or any other appropriate oscillatory electric motor, or any other suitable motor.

It will be apparent from the foregoing that my invention embodies an organized mechanism for supplying the cages 16 with quotas of nuts or other articles of food at intervals, and for cutting off the supplies of nuts or other articles of food during the cooking operations, and for discharging the cages 16 after the cooking operations in said cages. It will also be understood that nuts or other articles of food will be supplied to the cages 16 alternately, and the cages 16 will be dumped alternately so as to deposit the cooked articles in a receptacle 60, Figures 2 and 3, the said receptacle 60 being withdrawable through an opening 61 provided in one side wall of the casing 1.

Incident to the operation of the walking beam 41 it will be understood that the tappet levers 30 will be swung step by step, and at the proper time the arm 32 of each lever 30 by cooperation with the adjacent arm 17 will dump the cage 16 that carries the said arm 17. At the proper time the arm 32 will wipe past the arm 17 whereupon the cage 16 will gravitate back to the position shown in Figure 2. Thereupon the offset cam portion 33 of the lever 30 will operate against the anti-friction roller 24 and thereby open the cut-off plate 21 and permit the passage of a quota of nuts or other articles of food through the spout 19 and the guide tube 20 to the cage 16; the said nuts or other articles of food in the cage 16 being immersed in the hot oil or grease 70 contained in the receptacle 13. After the cam portion 33 of the lever referred to wipes past out of engagement with the adjacent roller 24, the cut-off plate 21 will be promptly closed, and it is then the province of an attendant to charge the hopper above the spout 19 mentioned with nuts or other articles of food.

While I prefer to employ oil or grease in the receptacle 13, it will be understood that any other liquid may be employed in said receptacle 13 without involving departure from my claimed invention.

It will be understood from the foregoing that notwithstanding the functions ascribed to the organized mechanism of my improvement, the said mechanism is simple and compact and is devoid of delicate parts such as are likely to get out of order after a short period of use; and it will also be apparent that in general my apparatus is reliable in operation and requires but little attention on the part of an operative.

While I have sought in the foregoing to impart a full, clear and exact understanding of the construction constituting the preferred embodiment of my invention, I do not desire to be understood as limiting myself to the specific construction and relative arrangement of parts as disclosed, my invention being defined by my appended claims within the scope of which modifications may be made without departure from my invention.

For instance when deemed expedient a portion of the casing of my improvement may be made of glass or other transparent material as designated by 75 and best shown in Figure 2, without affecting my invention, this so that the working of the apparatus in cooking peanuts and other nuts and food may be observed.

Having described my invention, what I claim and desire to secure by Letters Patent, is:—

1. In a cooking apparatus and in combination, a casing, heating means in said casing, a receptacle arranged above the heating means and adapted to contain liquid, swingable cages mounted on said receptacle and having arms, hoppers supported in the casing and having pendent spouts, said spouts located above said cages, swingable cut-off plates pivoted to the spouts and having arms and anti-friction rollers thereon, retractile springs interposed between the spouts and the cut-off plates for yieldingly maintaining the latter in closed positions, vertically swingable levers having arms to engage the arms of the cages and also having offset cam portions to engage the cut-off plates, ratchet disks fixed to said levers, dogs for preventing retrograde turning of said ratchet disks, a walking beam, dogs connected to said walking beam and arranged to engage the ratchet disks for the step by step turning thereof, and means for oscillating the walking beam.

2. In combination, a receptacle, dump cages hingedly connected thereto, hoppers mounted above said cages, normally closed cut-offs complementary to said hoppers, rotary means for dumping the cages and opening the cut-offs, a walking beam, means for oscillating said beam, and ratchet connections intermediate the end portions of the walking beam and the rotary means for dumping the cages and opening the cut-offs.

3. In combination, a receptacle, dump cages hingedly connected thereto, hoppers mounted above said cages, normally closed cut-offs complementary to said hoppers, rotary means for dumping the cages and opening the cut-offs, a walking beam, means for oscillating said beam, and ratchet connections intermediate the end portions of the walking beam and the rotary means for dumping the cages and opening the cut-offs; the said means for oscillating the walking beam being a motor fixed to the said beam and movable therewith.

4. In combination, a receptacle, a swingable dump cage mounted on the receptacle and arranged in one position to depend in the receptacle and receive articles to be cooked and in another position to discharge its contents at the side of the receptacle, a hopper mounted above the cage and the receptacle, a normally closed cut-off complementary to the hopper, rotary means for dumping the cage and opening the cut-off, and means for actuating said rotary means.

5. In combination, a receptacle, a dump cage, a hopper mounted above the cage, a normally closed cut-off complementary to the hopper, rotary means for dumping the cage and opening the cut-off, and means for actuating said rotary means; the dumping cage having an arm fixed thereto and the cut-off being equipped with an anti-friction roller, and the rotary means being in the form of a tappet lever having an arm to engage the arm of the dump cage and also having an offset cam portion for cooperating with the anti-friction roller of the cut-off.

In testimony whereof I affix my signature.

PATRICK McLAUGHLIN.